US012625772B2

(12) United States Patent
Kumar et al.

(10) Patent No.: US 12,625,772 B2
(45) Date of Patent: May 12, 2026

(54) REMOTE BACKUP RESTORE WITH A LOCAL DEDUPE ENGINE

(71) Applicant: Dell Products L.P., Round Rock, TX (US)

(72) Inventors: Shiv Kumar, Pune (IN); Kaushik Gupta, Pune (IN)

(73) Assignee: Dell Products L.P., Round Rock, TX (US)

( * ) Notice: Subject to any disclaimer, the term of this patent is extended or adjusted under 35 U.S.C. 154(b) by 358 days.

(21) Appl. No.: 18/335,853

(22) Filed: Jun. 15, 2023

(65) Prior Publication Data

US 2024/0419556 A1     Dec. 19, 2024

(51) Int. Cl.
| | |
|---|---|
| *G06F 16/174* | (2019.01) |
| *G06F 11/14* | (2006.01) |
| *G06F 11/1446* | (2026.01) |
| *G06F 16/14* | (2019.01) |

(52) U.S. Cl.
CPC ...... *G06F 11/1453* (2013.01); *G06F 11/1469* (2013.01); *G06F 16/152* (2019.01); *G06F 16/1748* (2019.01); *G06F 2201/84* (2013.01)

(58) Field of Classification Search
CPC ............................ G06F 16/152; G06F 16/1748
See application file for complete search history.

(56) References Cited

U.S. PATENT DOCUMENTS

| | | | | |
|---|---|---|---|---|
| 7,827,145 B1 * | 11/2010 | Spertus | ............... | G06F 11/1469 |
| | | | | 707/610 |
| 2005/0203851 A1 * | 9/2005 | King | ..................... | H04L 67/108 |
| | | | | 705/51 |
| 2020/0349035 A1 * | 11/2020 | Upadhyay | ............. | G06F 16/182 |
| 2023/0145634 A1 * | 5/2023 | Lobo | ................... | G06F 11/1469 |
| | | | | 713/168 |
| 2023/0403318 A1 * | 12/2023 | Spitulski | ................ | H04L 67/06 |

FOREIGN PATENT DOCUMENTS

| | | | | | |
|---|---|---|---|---|---|
| WO | WO-2019133249 A1 * | 7/2019 | .......... | G06F 16/137 |

* cited by examiner

*Primary Examiner* — Etienne P Leroux
*Assistant Examiner* — Dara J Glasser
(74) *Attorney, Agent, or Firm* — Amin, Turocy & Watson, LLP

(57) ABSTRACT

A system can maintain a backup of data stored on a source computer, wherein the backup is stored on a remote computer. The system can maintain, on the source computer, a file catalog, wherein the file catalog comprises a local path for a first file on the source computer, a remote backup location for the first file on the remote computer, and a first hash of the first file. The system can determine that a copy of the first file at the local path on the source computer is corrupted. The system can identify whether a second hash of a second file on the source computer matches the first hash of the first file. The system can, in response to determining that the second hash matches the first hash, repair first data of the first file with second data of the second file, and repair first metadata of the first file with second metadata from the remote backup location for the first file on the remote computer.

20 Claims, 13 Drawing Sheets

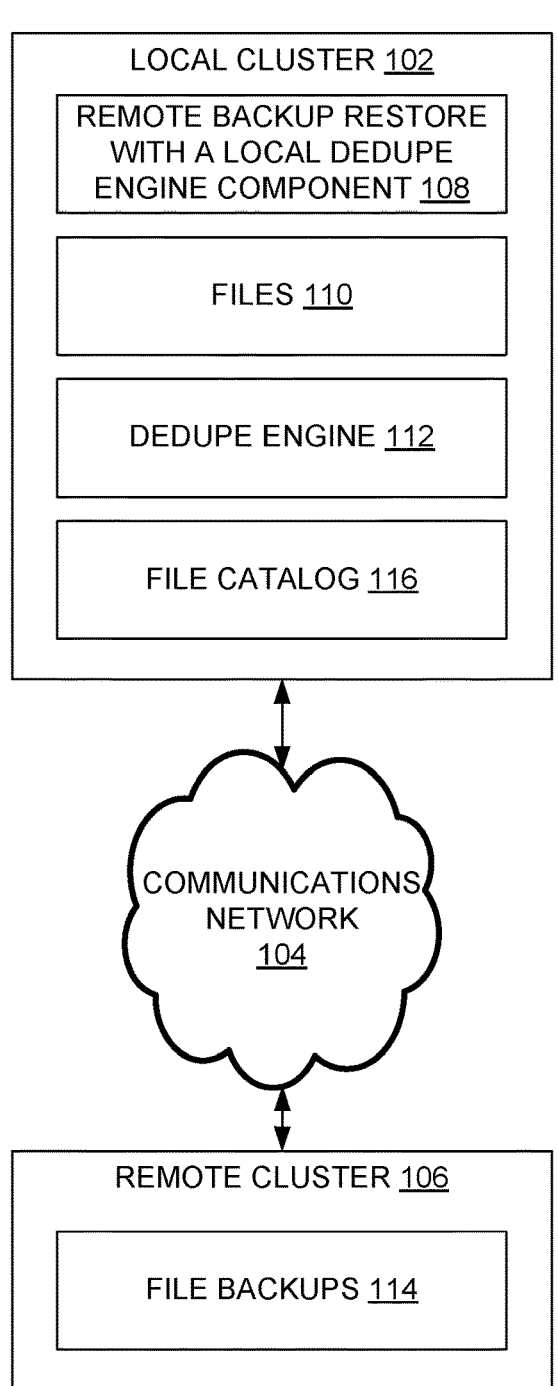
FIG. 1

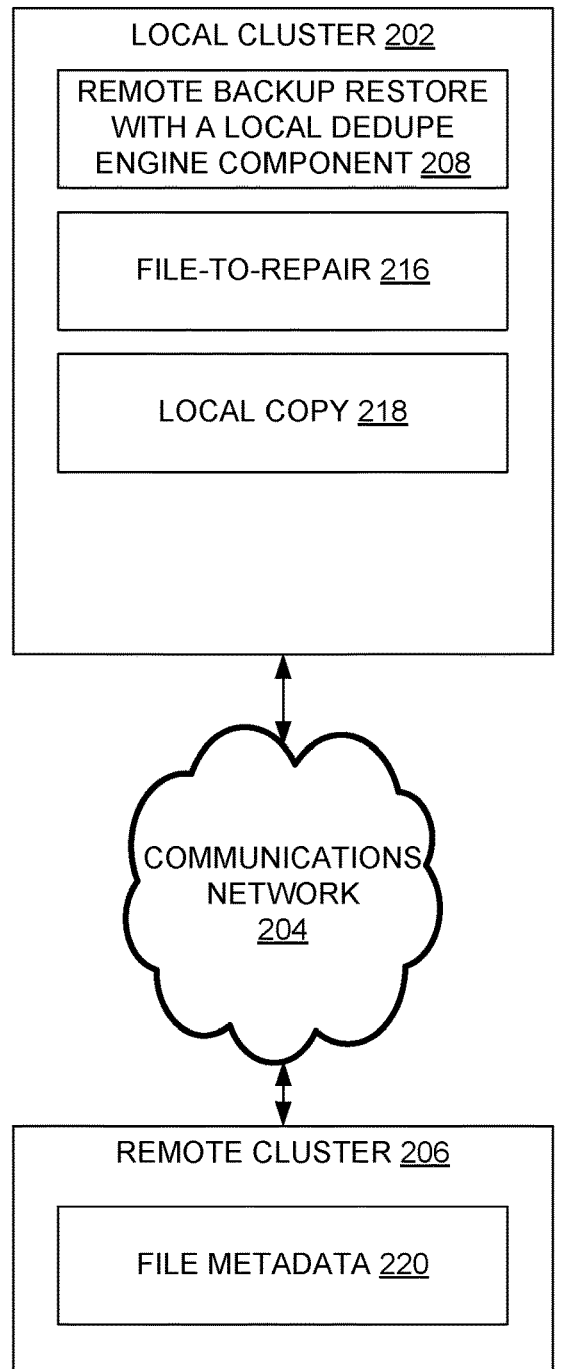
FIG. 2

300

—HASH 302—▶ | DEDUPE ENGINE 304 | —PATH(S) TO DUPLICATE FILE(S) 306—▶

400

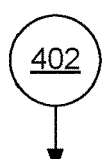

402

MAINTAINING A BACKUP OF DATA STORED ON A SOURCE COMPUTER, WHEREIN THE BACKUP IS STORED ON A REMOTE COMPUTER 404

MAINTAINING, ON THE SOURCE COMPUTER, A FILE CATALOG, WHEREIN THE FILE CATALOG COMPRISES A LOCAL PATH FOR A FIRST FILE ON THE SOURCE COMPUTER, A REMOTE BACKUP LOCATION FOR THE FIRST FILE ON THE REMOTE COMPUTER, AND A FIRST HASH OF THE FIRST FILE 406

DETERMINING THAT A COPY OF THE FIRST FILE AT THE LOCAL PATH ON THE SOURCE COMPUTER IS CORRUPTED 408

IDENTIFYING WHETHER A SECOND HASH OF A SECOND FILE ON THE SOURCE COMPUTER MATCHES THE FIRST HASH OF THE FIRST FILE 410

IN RESPONSE TO DETERMINING THAT THE SECOND HASH MATCHES THE FIRST HASH, REPAIRING FIRST DATA OF THE FIRST FILE WITH SECOND DATA OF THE SECOND FILE, AND REPAIRING FIRST METADATA OF THE FIRST FILE WITH SECOND METADATA FROM THE REMOTE BACKUP LOCATION FOR THE FIRST FILE ON THE REMOTE COMPUTER 412

500
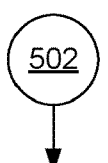
502
DETERMINING THAT NO HASH OF A FILE ON THE SOURCE COMPUTER MATCHES THE FIRST HASH OF THE FIRST FILE 504
REPAIRING THE FIRST DATA AND THE FIRST METADATA OF THE FIRST FILE WITH THIRD DATA AND THE SECOND METADATA FROM THE REMOTE BACKUP LOCATION FOR THE FIRST FILE ON THE REMOTE COMPUTER 506
508
FIG. 5

600
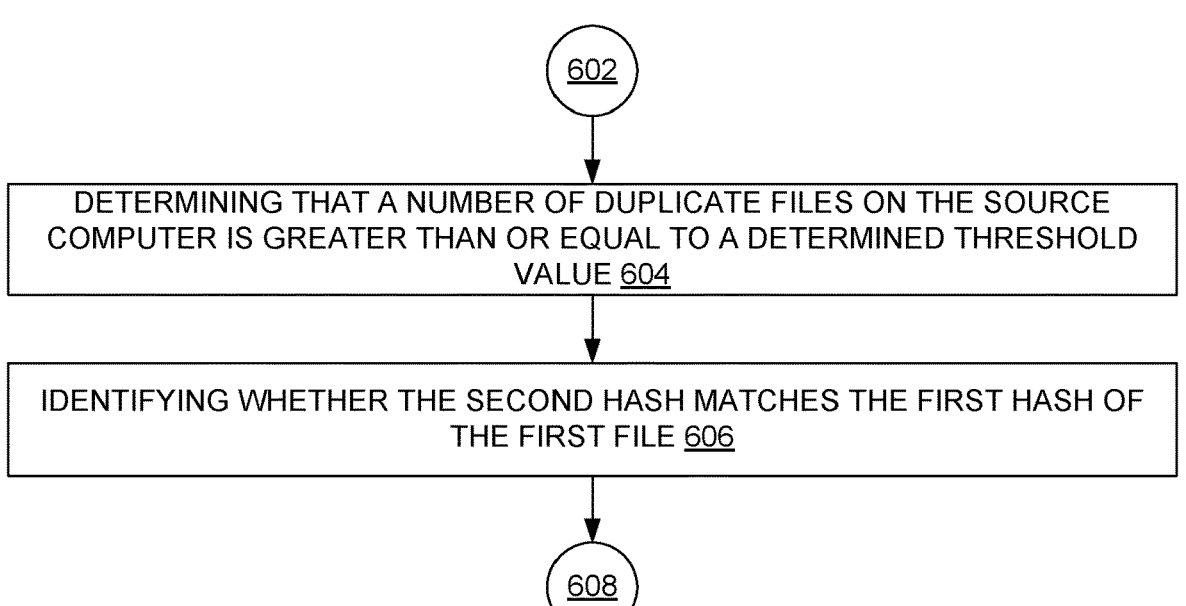
602
DETERMINING THAT A NUMBER OF DUPLICATE FILES ON THE SOURCE
COMPUTER IS GREATER THAN OR EQUAL TO A DETERMINED THRESHOLD
VALUE 604
IDENTIFYING WHETHER THE SECOND HASH MATCHES THE FIRST HASH OF
THE FIRST FILE 606
608
FIG. 6

700
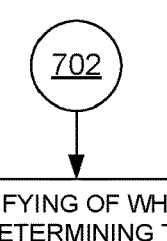
SUBSEQUENT TO PERFORMING IDENTIFYING OF WHETHER THE SECOND HASH MATCHES THE FIRST HASH OF THE FIRST FILE, DETERMINING THAT A NUMBER OF DUPLICATE FILES ON THE SOURCE COMPUTER IS LESS THAN A DETERMINED THRESHOLD VALUE 704
DETERMINING TO HALT CONSIDERING LOCAL COPIES OF FILES WHEN REPAIRING FILES 706
FIG. 7

800

900
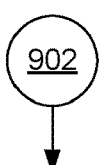
902
SENDING, TO A DATA DEDUPLICATION COMPONENT OF THE SOURCE COMPUTER, THE FIRST HASH FROM THE FILE CATALOG 904
RECEIVING RESPECTIVE LOCAL FILE PATHS OF A GROUP OF FILES THAT COMPRISES THE SECOND FILE, WHEREIN RESPECTIVE HASHES OF RESPECTIVE FILES OF THE GROUP OF FILES MATCH THE FIRST HASH 906
908
FIG. 9

1000

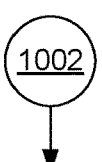

1002

MAINTAINING A FILE CATALOG, WHEREIN THE FILE CATALOG COMPRISES A LOCAL PATH FOR A FIRST FILE ON THE SYSTEM, A REMOTE BACKUP LOCATION FOR THE FIRST FILE ON A REMOTE COMPUTER THAT STORES A BACKUP OF DATA OF THE SYSTEM, AND A FIRST HASH OF THE FIRST FILE 1004

DETERMINING THAT A COPY OF THE FIRST FILE AT THE LOCAL PATH ON THE SYSTEM IS CORRUPTED 1006

IDENTIFYING WHETHER A SECOND HASH OF A SECOND FILE ON THE SYSTEM MATCHES THE FIRST HASH OF THE FIRST FILE OPERATION 1008

IN RESPONSE TO DETERMINING THAT THE SECOND HASH MATCHES THE FIRST HASH, REPAIRING DATA OF THE FIRST FILE WITH DATA OF THE SECOND FILE, AND REPAIRING METADATA OF THE FIRST FILE WITH METADATA FROM THE REMOTE BACKUP LOCATION FOR THE FIRST FILE ON THE REMOTE COMPUTER 1010

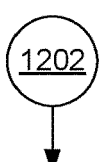

MAINTAINING A FILE CATALOG, WHEREIN THE FILE CATALOG COMPRISES A LOCAL PATH FOR A FIRST FILE, A REMOTE BACKUP LOCATION FOR THE FIRST FILE ON A REMOTE COMPUTER THAT STORES A BACKUP OF LOCAL DATA, AND A FIRST HASH OF THE FIRST FILE 1204

DETERMINING THAT A COPY OF THE FIRST FILE AT THE LOCAL PATH IS TO BE REPAIRED 1206

IDENTIFYING WHETHER A SECOND HASH OF A SECOND FILE THAT IS STORED LOCALLY MATCHES THE FIRST HASH OF THE FIRST FILE 1208

IN RESPONSE TO DETERMINING THAT THE SECOND HASH MATCHES THE FIRST HASH, REPAIRING DATA OF THE FIRST FILE WITH DATA OF THE SECOND FILE, AND REPAIRING METADATA OF THE FIRST FILE WITH METADATA FROM THE REMOTE BACKUP LOCATION 1210

REMOTE BACKUP RESTORE WITH A LOCAL DEDUPE ENGINE

BACKGROUND

Computer systems can facilitate data storage. Backups of data can be maintained. Stored data can become corrupted.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can maintain a backup of data stored on a source computer, wherein the backup is stored on a remote computer. The system can maintain, on the source computer, a file catalog, wherein the file catalog comprises a local path for a first file on the source computer, a remote backup location for the first file on the remote computer, and a first hash of the first file. The system can determine that a copy of the first file at the local path on the source computer is corrupted. The system can identify whether a second hash of a second file on the source computer matches the first hash of the first file. The system can, in response to determining that the second hash matches the first hash, repair first data of the first file with second data of the second file, and repair first metadata of the first file with second metadata from the remote backup location for the first file on the remote computer.

An example method can comprise maintaining, by a system comprising a processor, a file catalog, wherein the file catalog comprises a local path for a first file on the system, a remote backup location for the first file on a remote computer that stores a backup of data of the system, and a first hash of the first file. The method can further comprise determining, by the system, that a copy of the first file at the local path on the system is corrupted. The method can further comprise identifying, by the system, whether a second hash of a second file on the system matches the first hash of the first file. The method can further comprise, in response to determining that the second hash matches the first hash, repairing, by the system, data of the first file with data of the second file, and repairing, by the system, metadata of the first file with metadata from the remote backup location for the first file on the remote computer.

An example non-transitory computer-readable medium can comprise instructions that, in response to execution, cause a system comprising a processor to perform operations. These operations can comprise maintaining a file catalog, wherein the file catalog comprises a local path for a first file, a remote backup location for the first file on a remote computer that stores a backup of local data, and a first hash of the first file. These operations can further comprise determining that a copy of the first file at the local path is to be repaired. These operations can further comprise identifying whether a second hash of a second file that is stored locally matches the first hash of the first file. These operations can further comprise, in response to determining that the second hash matches the first hash, repairing data of the first file with data of the second file, and repairing metadata of the first file with metadata from the remote backup location.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 1 illustrates an example system architecture that can facilitate remote backup restore with a local dedupe engine, in accordance with an embodiment of this disclosure;

FIG. 2 illustrates another example system architecture that can facilitate remote backup restore with a local dedupe engine, in accordance with an embodiment of this disclosure;

FIG. 4 illustrates an example process flow that can facilitate remote backup restore with a local dedupe engine, in accordance with an embodiment of this disclosure;

FIG. 5 illustrates another example process flow that can facilitate remote backup restore with a local dedupe engine, in accordance with an embodiment of this disclosure;

FIG. 6 illustrates another example process flow that can facilitate remote backup restore with a local dedupe engine, in accordance with an embodiment of this disclosure;

FIG. 7 illustrates another example process flow that can facilitate remote backup restore with a local dedupe engine, in accordance with an embodiment of this disclosure;

FIG. 9 illustrates another example process flow that can facilitate remote backup restore with a local dedupe engine, in accordance with an embodiment of this disclosure;

FIG. 10 illustrates another example process flow that can facilitate remote backup restore with a local dedupe engine, in accordance with an embodiment of this disclosure;

FIG. 12 illustrates another example process flow that can facilitate remote backup restore with a local dedupe engine, in accordance with an embodiment of this disclosure;

DETAILED DESCRIPTION

Overview

Figure 3:
FIG. 3 illustrates another example system architecture that can facilitate remote backup restore with a local dedupe engine, in accordance with an embodiment of this disclosure.

The present examples generally involve computing clusters. It can be appreciated that the present techniques can be implemented in other system architectures where data is backed up between computers.

In a computing scenario, there can be a topography where a source computing cluster is being backed up to a remote computing cluster. If a file gets corrupted on the source computing cluster, some prior approaches can attempt to repair the source file with a copy of the file from the remote computing cluster. However, a duplicate file could exist locally on the source computing cluster. In some examples, a probability that there is a local duplicate file can be higher with certain file types, such as with media files where different home directories might store the same file.

Fetching a file copy from the remote computing cluster could waste computing resources compared to using a local file copy. The present techniques can be applied to file restoration scenarios, where first a file is searched for locally, and if not found locally, then searched for in a remote computing cluster.

In some examples, this local search approach can be implemented based on statistics from a dedupe engine. That is, in scenarios where there is a lot of file-level deduplication present on the local computing cluster, then a local search approach can be applied.

An example of statistics can be a percentage of total stored files that are duplicates.

In some examples, the present techniques can be implemented as follows. When a file is backed up, a local computing cluster can maintain a catalog for the file. The catalog can specify a local path (e.g., gfid) and a remote location where the file is backed up (e.g., a combination of a cluster's ID and a location of a snapshot within that cluster, such as cluster_id and dataset/snapshot-id). The catalog can also contain a hash (e.g., a sha1sum) of the file.

When a backed-up file is to be repaired or restored, the hash can be fetched from the catalog. If there is a local file with that same hash (as identified in the catalog), then that local file can be used to repair or restore the backed-up file.

In some examples where a local copy of a file is used to repair or restore a file, it can be that this local copy lacks the same metadata (e.g., access control lists (ACLs), last scan, modified time, creation time) (e.g., extended attributes in some system architectures) as the file being repaired or restored. This metadata can be fetched from the remote computing cluster (without consuming computing resources on fetching the file itself). In example ratios that have a high ratio of duplicated files, this approach can conserve computing resources relative to always fetching a remote copy of the file.

Where there is an incremental backup performed, it can be that a hash for a file is determined again, and the catalog is updated with this new hash.

A dedupe engine can generally comprise a computer component that is configured to increase available computer storage by eliminating storage of multiple copies of the same data. In some examples where computer clusters are used, an instance of dedupe engine can generally operate on each cluster. A dedupe engine can provide an interface where, if a hash for a file is provided as input, the dedupe engine can return local paths (or stubs) of duplicate files. In examples where stubs are used, this can be an architecture where a separate inode for each file exists (which can be referred to as a stub), and then there is one copy of the corresponding data stored in a shadow store. A shadow store can generally comprise a file system container that facilitates storing data in a shareable manner.

In some examples, a stub can comprise a container that represents an object. A stub can store data required to provide a user account with the whole object, though may itself not store everything about the object. For example, it can be that a file is not a stub because it has an anode that has metadata and points to blocks of data. When that same file is archived to cheaper storage, it can be stored there as a plain file (e.g., a stub) that contains some metadata and identifies a location of the contents of the file (e.g., global-cluster-id, global-file-id, etc.), so that, when queried, actual data for the file can be fetched from a specific cluster by referencing a specific global-file-id.

In some examples, remote backup restore with a local dedupe engine can be dynamically enabled/disabled. For example, if a number of duplicate files on the source computing cluster is under a threshold, then it can be that computing resources are not preserved by implementing local backup restoration. It can be that a count of duplicate files is maintained (such as by a shadow store). If this count is above a threshold, then local backup restoration is enabled, and otherwise it is disabled.

When local backup restoration is disabled, maintaining hashes of backed up files in the catalog can still be performed. It can be that the duplicate file count can cross a threshold so as to enable local backup restoration, at which point these hashes can be used for local backup restoration.

In contrast to the present techniques, some prior techniques fetch files from a remote backup regardless of whether a copy exists locally.

Example Architectures

FIG. 1 illustrates an example system architecture 100 that can facilitate remote backup restore with a local dedupe engine, in accordance with an embodiment of this disclosure.

System architecture 100 comprises local cluster 102, communications network 104, and remote cluster 106. In turn, local cluster 102 comprises remote backup restore with a local dedupe engine component 108, files 110, dedupe engine 112, and file catalog 116; and remote cluster 106 comprises file backups 114.

A computing cluster (e.g., local cluster 102) can generally comprise a group of computers that are configured to work together such as to be logically addressed as a single computer system. Examples used herein generally relate to computing clusters, and it can be appreciated that the present techniques can be applied to other types of computer architectures.

Figure 13:
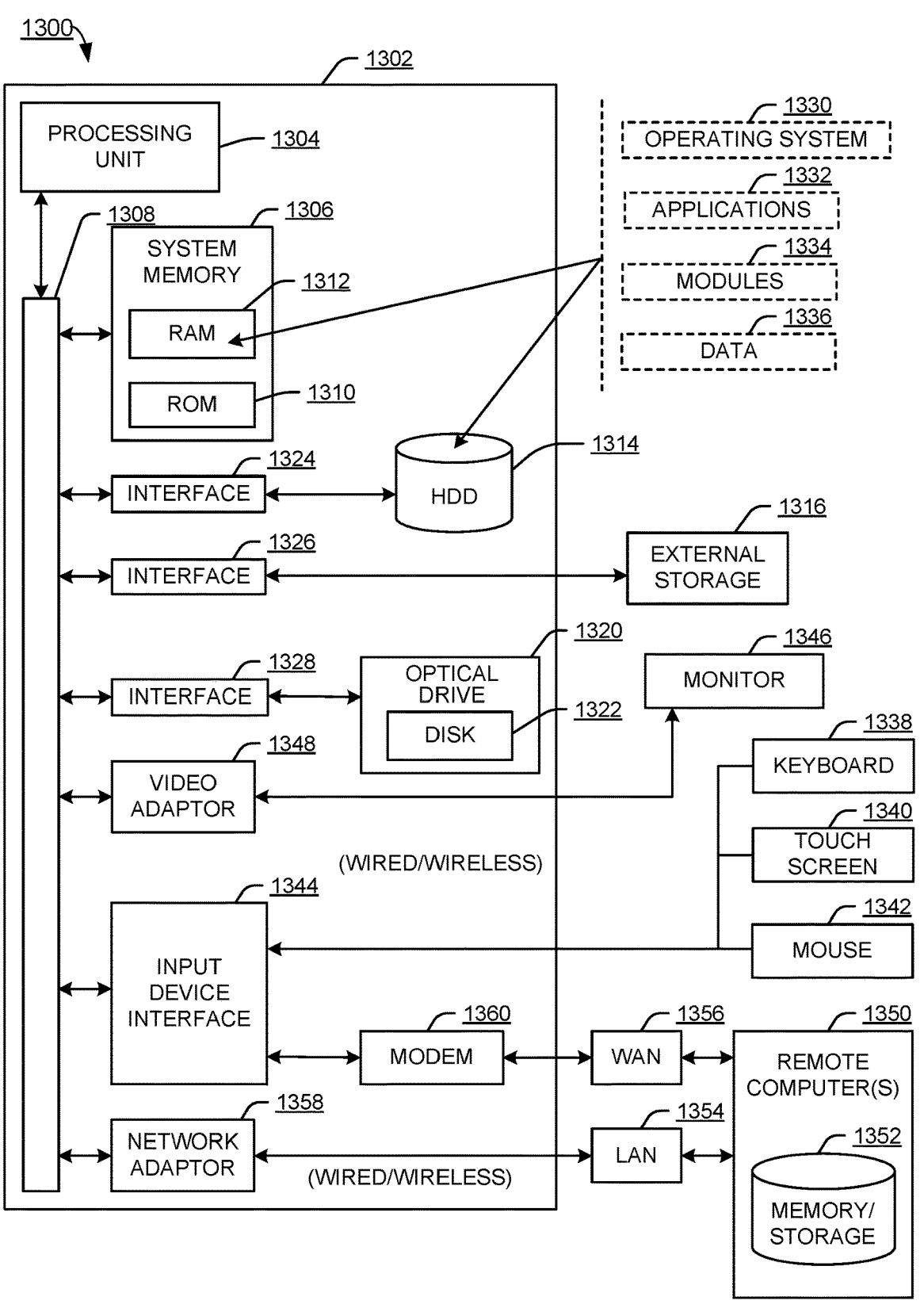
FIG. 13 illustrates an example block diagram of a computer operable to execute an embodiment of this disclosure.

Each of local cluster 102 and/or remote cluster 106 can be implemented with part(s) of computing environment 1300 of FIG. 13. Communications network 104 can comprise a computer communications network, such as the Internet.

Local cluster 102 can store computer data in files 110. Data in files 110 can be deduplicated by dedupe engine 112, and backed up to file backups 114 on remote cluster 106.

File catalog 116 can comprise a data store that can specify a local path (e.g., gfid) and a remote location where the file is backed up (e.g., a combination of a cluster's ID and a location of a snapshot within that cluster, such as cluster_id and dataset/snapshot-id). The catalog can also contain a hash (e.g., a sha1sum) of the file. In some examples, remote backup restore with a local dedupe engine component 108 can access file catalog 116 to determine where a file to-be-repaired is backed up remotely.

When a file is determined to be corrupted or otherwise damaged or lost, and local recovery is enabled, remote backup restore with a local dedupe engine component 108 can check for a local copy of the file to recover the data from. Where such a local copy is found, remote backup restore with a local dedupe engine component 108 can restore the file with that local copy, as well as metadata for the file-to-be-recovered from file backups 114. This approach can save time and network bandwidth by reducing an amount of data transferred from remote cluster 106.

In some examples, remote backup restore with a local dedupe engine component 108 can implement part(s) of the process flows of FIGS. 4-12 to implement remote backup restore with a local dedupe engine.

It can be appreciated that system architecture 100 is one example system architecture for remote backup restore with a local dedupe engine, and that there can be other system architectures that facilitate remote backup restore with a local dedupe engine.

FIG. 2 illustrates another example system architecture 200 that can facilitate remote backup restore with a local dedupe engine, in accordance with an embodiment of this disclosure. In some examples, part(s) of system architecture 200 can be used to implement part(s) of system architecture 100 to facilitate remote backup restore with a local dedupe engine.

System architecture 200 comprises local cluster 202 (which can be similar to local cluster 102 of FIG. 1), communications network 204 (which can be similar to communications network 104), and remote cluster 206 (which can be similar to remote cluster 106). In turn, local cluster 202 comprises remote backup restore with a local dedupe engine component 208 (which can be similar to remote backup restore with a local dedupe engine component 108), file-to-repair 216, and local copy 218; and remote cluster 206 comprises file metadata 220.

File-to-repair 216 can comprise a file of files 110 that is to be repaired. Local copy 218 can comprise a local copy of file-to-repair 216 (where they are both stored on local cluster 202). File metadata 220 can comprise metadata for file-to-repair 216 that is stored in file backups 114.

When it is determined to repair file-to-repair 216, remote backup restore with a local dedupe engine component 208 can determine that local copy 218 exists, and combine it with file metadata 220 to repair file-to-repair 216.

It can be that local copy 218 has its own metadata, but this is different metadata than for file-to-repair 216. For example, this could be a different copy of the file controlled by a different user account that has a different creation time or last-accessed time than file-to-repair 216. So, in some examples, regardless of whether there is a local copy of file-to-repair 216, the metadata for file-to-repair 216 can be fetched from file metadata 220.

FIG. 3 illustrates another example system architecture 300 that can facilitate remote backup restore with a local dedupe engine, in accordance with an embodiment of this disclosure. In some examples, part(s) of system architecture 300 can be used to implement part(s) of system architecture 100 to facilitate remote backup restore with a local dedupe engine.

System architecture 300 comprises hash 302, dedupe engine 304 (which can be similar to dedupe engine 112 of FIG. 1), and path(s) to duplicate file(s) 306. In some examples, a hash of a file to be repaired (e.g., file-to-repair 216 of FIG. 2) can be provided as input to dedupe engine. Where that hash matches a hash for other file(s) stored locally (e.g., on local cluster 102), then dedupe engine can return a file system path (e.g., /usr/file.txt) for those file(s), as path(s) to duplicate file(s) 306. This information can be used by remote backup restore with a local dedupe engine component 108 to recover the file using local file data.

Example Process Flows

FIG. 4 illustrates an example process flow 400 that can facilitate remote backup restore with a local dedupe engine, in accordance with an embodiment of this disclosure. In some examples, one or more embodiments of process flow 400 can be implemented by remote backup restore with a local dedupe engine component 108 of FIG. 1, or computing environment 1300 of FIG. 13.

It can be appreciated that the operating procedures of process flow 400 are example operating procedures, and that there can be embodiments that implement more or fewer operating procedures than are depicted, or that implement the depicted operating procedures in a different order than as depicted. In some examples, process flow 400 can be implemented in conjunction with one or more embodiments of one or more of process flow 500 of FIG. 5, process flow 600 of FIG. 6, process flow 700 of FIG. 7, process flow 800 of FIG. 8, process flow 900 of FIG. 9, process flow 1000 of FIG. 10, process flow 1100 of FIG. 11, and/or process flow 1200 of FIG. 12.

Process flow 400 begins with 402, and moves to operation 404.

Operation 404 depicts maintaining a backup of data stored on a source computer, wherein the backup is stored on a remote computer. Using the example of FIG. 1, local cluster 102 can store files 110, and files 110 can be backed up with file backups 114 on remote cluster 106.

After operation 404, process flow 400 moves to operation 406.

Operation 406 depicts maintaining, on the source computer, a file catalog, wherein the file catalog comprises a local path for a first file on the source computer, a remote backup location for the first file on the remote computer, and a first hash of the first file. That is, using the example of FIG. 1, local cluster 102 can comprise file catalog 116.

After operation 406, process flow 400 moves to operation 408.

Operation 408 depicts determining that a copy of the first file at the local path on the source computer is corrupted. That is, using the example of FIG. 1, a file of files 110 can be determined to be corrupted.

After operation 408, process flow 400 moves to operation 410.

Operation 410 depicts identifying whether a second hash of a second file on the source computer matches the first hash of the first file. That is, using the example of FIG. 1, dedupe engine 112 can be accessed, using as input a hash of the first file, and can output file paths to any matching files in files 110.

In some examples, operation 410 is performed by a data deduplication component of the source computer. The data deduplication component can be similar to dedupe engine 112 of FIG. 1. That is, a dedupe engine should provide an interface where, if a hash for a file is provided as input, the dedupe engine is configured return the local file paths (or stubs) that are duplicate.

After operation 410, process flow 400 moves to operation 412.

Operation 412 depicts, in response to determining that the second hash matches the first hash, repairing first data of the first file with second data of the second file, and repairing first metadata of the first file with second metadata from the remote backup location for the first file on the remote computer. That is, using the example of FIG. 2, a file can be restored using local data (local copy 218) and remote metadata (from file metadata 220).

After operation 412, process flow 400 moves to 414, where process flow 400 ends.

FIG. 5 illustrates another example process flow 500 that can facilitate remote backup restore with a local dedupe engine, in accordance with an embodiment of this disclosure. In some examples, one or more embodiments of process flow 500 can be implemented by remote backup restore with a local dedupe engine component 108 of FIG. 1, or computing environment 1300 of FIG. 13.

It can be appreciated that the operating procedures of process flow 500 are example operating procedures, and that there can be embodiments that implement more or fewer operating procedures than are depicted, or that implement the depicted operating procedures in a different order than as depicted. In some examples, process flow 500 can be implemented in conjunction with one or more embodiments of one or more of process flow 400 of FIG. 4, process flow 600 of FIG. 6, process flow 700 of FIG. 7, process flow 800 of FIG. 8, process flow 900 of FIG. 9, process flow 1000 of FIG. 10, process flow 1100 of FIG. 11, and/or process flow 1200 of FIG. 12.

Process flow 500 begins with 502, and moves to operation 504.

Operation 504 depicts determining that no hash of a file on the source computer matches the first hash of the first file. This can indicate that there is not a local file with a matching hash to a file being recovered. Process flow 500 can be viewed in conjunction with process flow 400 of FIG. 4, where the first file is being recovered and it is stored on the source computer.

After operation 504, process flow 500 moves to operation 506.

Operation 506 depicts repairing the first data and the first metadata of the first file with third data and the second metadata from the remote backup location for the first file on the remote computer. That is, in contrast to a scenario where local file data is used for recovery (e.g., in operation 412 of FIG. 4), in operation 506, both remote data (the third data) and remote metadata (the second metadata) can be used to recover a file.

In some examples, operations 504-506 comprise, in response to determining that no hash of a file on the source computer matches the first hash of the first file, repairing the first data and the first metadata of the first file with third data and the second metadata from the remote backup location for the first file on the remote computer.

After operation 506, process flow 500 moves to 508, where process flow 500 ends.

FIG. 6 illustrates another example process flow 600 that can facilitate remote backup restore with a local dedupe engine, in accordance with an embodiment of this disclosure. In some examples, one or more embodiments of process flow 600 can be implemented by remote backup restore with a local dedupe engine component 108 of FIG. 1, or computing environment 1300 of FIG. 13.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 400 of FIG. 4, process flow 500 of FIG. 5, process flow 700 of FIG. 7, process flow 800 of FIG. 8, process flow 900 of FIG. 9, process flow 1000 of FIG. 10, process flow 1100 of FIG. 11, and/or process flow 1200 of FIG. 12.

Process flow 600 begins with 602, and moves to operation 604.

Operation 604 depicts determining that a number of duplicate files on the source computer is greater than or equal to a determined threshold value. That is, a threshold duplicate file count on a local system can be used to enable remote backup restore with a local dedupe engine. This can be because a large number of duplicate files can indicate that there is a likely chance of there being a local backup of the file being recovered.

After operation 604, process flow 600 moves to operation 606.

Operation 606 depicts identifying whether the second hash matches the first hash of the first file. In some examples, this can be performed in a similar manner as operation 412 of FIG. 4.

In some examples, operations 604-606 comprise, identifying of whether the second hash matches the first hash of the first file is performed based on determining that a number of duplicate files on the source computer is greater than or equal to a determined threshold value.

After operation 606, process flow 600 moves to 608, where process flow 600 ends.

FIG. 7 illustrates an example process flow 700 that can facilitate remote backup restore with a local dedupe engine, in accordance with an embodiment of this disclosure. In some examples, one or more embodiments of process flow 700 can be implemented by remote backup restore with a local dedupe engine component 108 of FIG. 1, or computing environment 1300 of FIG. 13.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 400 of FIG. 4, process flow 500 of FIG. 5, process flow 600 of FIG. 6, process flow 800 of FIG. 8, process flow 900 of FIG. 9, process flow 1000 of FIG. 10, process flow 1100 of FIG. 11, and/or process flow 1200 of FIG. 12.

Process flow 700 begins with 702, and moves to operation 704.

Operation 704 depicts, subsequent to performing identifying of whether the second hash matches the first hash of the first file, determining that a number of duplicate files on the source computer is less than a determined threshold value. This identifying can be similar to that of operation 410 of FIG. 4. The threshold can be similar to that of operation 604 of FIG. 6, where here, the count has dropped below the threshold.

After operation 704, process flow 700 moves to operation 706.

Operation 706 depicts determining to halt considering local copies of files when repairing files. That is, when there are not enough local duplicates (generally, rather than specifically duplicates of the file being restored), checking for a local copy can be suspended (and remote data restoration can occur).

In some examples, operations 604-606 comprise, subsequent to performing identifying of whether the second hash matches the first hash of the first file, determining to halt considering local copies of files when repairing files in response to determining that a number of duplicate files on the source computer is less than a determined threshold value.

After operation 706, process flow 700 moves to 708, where process flow 700 ends.

Figure 8:
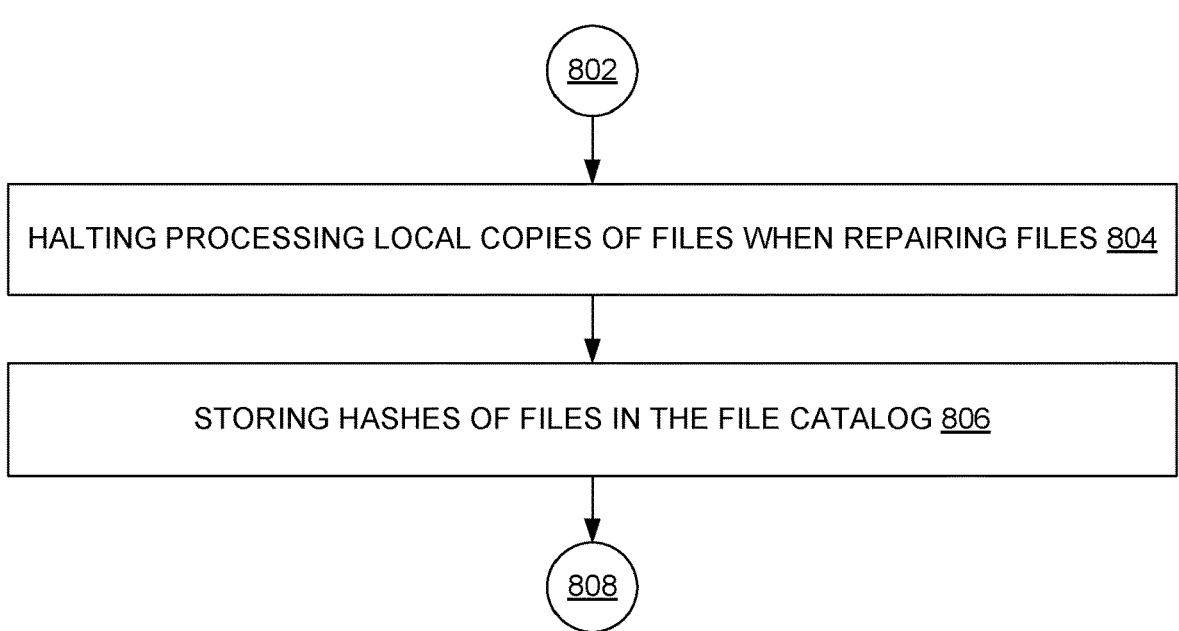
FIG. 8 illustrates another example process flow that can facilitate remote backup restore with a local dedupe engine, in accordance with an embodiment of this disclosure.

FIG. 8 illustrates an example process flow 800 that can facilitate remote backup restore with a local dedupe engine, in accordance with an embodiment of this disclosure. In some examples, one or more embodiments of process flow 800 can be implemented by remote backup restore with a local dedupe engine component 108 of FIG. 1, or computing environment 1300 of FIG. 13.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 400 of FIG. 4, process flow 500 of FIG. 5, process flow 600 of FIG. 6, process flow 700 of FIG. 7, process flow 900 of FIG. 9, process flow 1000 of FIG. 10, process flow 1100 of FIG. 11, and/or process flow 1200 of FIG. 12.

Process flow 800 begins with 802, and moves to operation 804.

Operation 804 depicts halting processing local copies of files when repairing files. This can be similar to operation 606, where halting processing local copies of files when repairing files is performed as a result of there being less than a threshold number of file duplicates on the local system.

After operation 804, process flow 800 moves to operation 806.

Operation 806 depicts storing hashes of files in the file catalog. That is, in some examples, even when remote backup restore with a local dedupe engine is halted, a hash of backed up files can be maintained in a catalog. This can facilitate remote backup restore with a local dedupe engine when if it is enabled in the future.

Together, operations 804-806 can comprise storing hashes of files in the file catalog while processing local copies of files when repairing files is halted.

After operation 806, process flow 800 moves to 808, where process flow 800 ends.

FIG. 9 illustrates an example process flow 900 that can facilitate remote backup restore with a local dedupe engine, in accordance with an embodiment of this disclosure. In some examples, one or more embodiments of process flow 900 can be implemented by remote backup restore with a local dedupe engine component 108 of FIG. 1, or computing environment 1300 of FIG. 13.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 400 of FIG. 4, process flow 500 of FIG. 5, process flow 600 of FIG. 6, process flow 700 of FIG. 7, process flow 800 of FIG. 8, process flow 1000 of FIG. 10, process flow 1100 of FIG. 11, and/or process flow 1200 of FIG. 12.

Process flow 900 begins with 902, and moves to operation 904.

Operation 904 depicts sending, to a data deduplication component of the source computer, the first hash from the file catalog. That is, in repairing a file, remote backup restore with a local dedupe engine component 108 of FIG. 1 can send a hash of a file being repaired to dedupe engine 112.

After operation 904, process flow 900 moves to operation 906.

Operation 906 depicts receiving respective local file paths of a group of files that comprises the second file, wherein respective hashes of respective files of the group of files match the first hash. Continuing with the example of FIG. 1, here where dedupe engine 112 identifies local copies of the file (based on comparing file hashes), it can return as output a list of file system paths to those file copies.

In some examples, operations 904-906 can be used to implement operation 410 of FIG. 4.

After operation 906, process flow 900 moves to 908, where process flow 900 ends.

FIG. 10 illustrates an example process flow 1000 that can facilitate remote backup restore with a local dedupe engine, in accordance with an embodiment of this disclosure. In some examples, one or more embodiments of process flow 1000 can be implemented by remote backup restore with a local dedupe engine component 108 of FIG. 1, or computing environment 1300 of FIG. 13.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 400 of FIG. 4, process flow 500 of FIG. 5, process flow 600 of FIG. 6, process flow 700 of FIG. 7, process flow 800 of FIG. 8, process flow 900 of FIG. 9, process flow 1100 of FIG. 11, and/or process flow 1200 of FIG. 12.

Process flow 1000 begins with 1002, and moves to operation 1004.

Operation 1004 depicts maintaining a file catalog, wherein the file catalog comprises a local path for a first file on the system, a remote backup location for the first file on a remote computer that stores a backup of data of the system, and a first hash of the first file. In some examples, operation 1004 can be implemented in a similar manner as operations 404-406 of FIG. 4.

After operation 1004, process flow 1000 moves to operation 1006.

Operation 1006 depicts determining that a copy of the first file at the local path on the system is corrupted. In some examples, operation 1006 can be implemented in a similar manner as operation 408 of FIG. 4.

In some examples operation 1006 comprises enabling processing of local file copies when restoring the file based on a current level of file deduplication on the system. That is, remote backup restore with a local dedupe engine can be dynamically turned on where there is a high level of local file deduplication.

In some examples, operation 1006 comprises enabling processing of local file copies when restoring the file based on file duplication statistics received from a deduplication engine. That is, remote backup restore with a local dedupe engine can be enabled based on statistics determined from a deduplication engine.

In some examples, this comprises determining the current level of file deduplication on the system from a deduplication component of the system. That is, a current level of file deduplication can be tracked by a dedupe engine.

After operation 1006, process flow 1000 moves to operation 1008.

Operation 1008 depicts identifying whether a second hash of a second file on the system matches the first hash of the first file operation. In some examples, operation 1008 can be implemented in a similar manner as operation 410 of FIG. 4.

In some examples, operation 1008 comprises sending, to a data deduplication component of the system, the first hash from the file catalog, and receiving respective stubs of a group of files that comprises the second file, wherein respective hashes of respective files of the group of files match the first hash. This can be similar to process flow 900, where dedupe engine 112 of FIG. 1 returns file stubs rather than file paths.

In some examples, operation 1008 comprises sending, to a data deduplication component of the system, the first hash from the file catalog, receiving, from the data deduplication component, an indication that no hashes of files match the first hash. That is, in some examples it can be that there are not any identified duplicate files locally stored.

After operation 1008, process flow 1000 moves to operation 1010.

Operation 1010 depicts, in response to determining that the second hash matches the first hash, repairing data of the first file with data of the second file, and repairing metadata of the first file with metadata from the remote backup location for the first file on the remote computer. In some examples, operation 1010 can be implemented in a similar manner as operation 412 of FIG. 4.

After operation 1010, process flow 1000 moves to 1012, where process flow 1000 ends.

Figure 11:
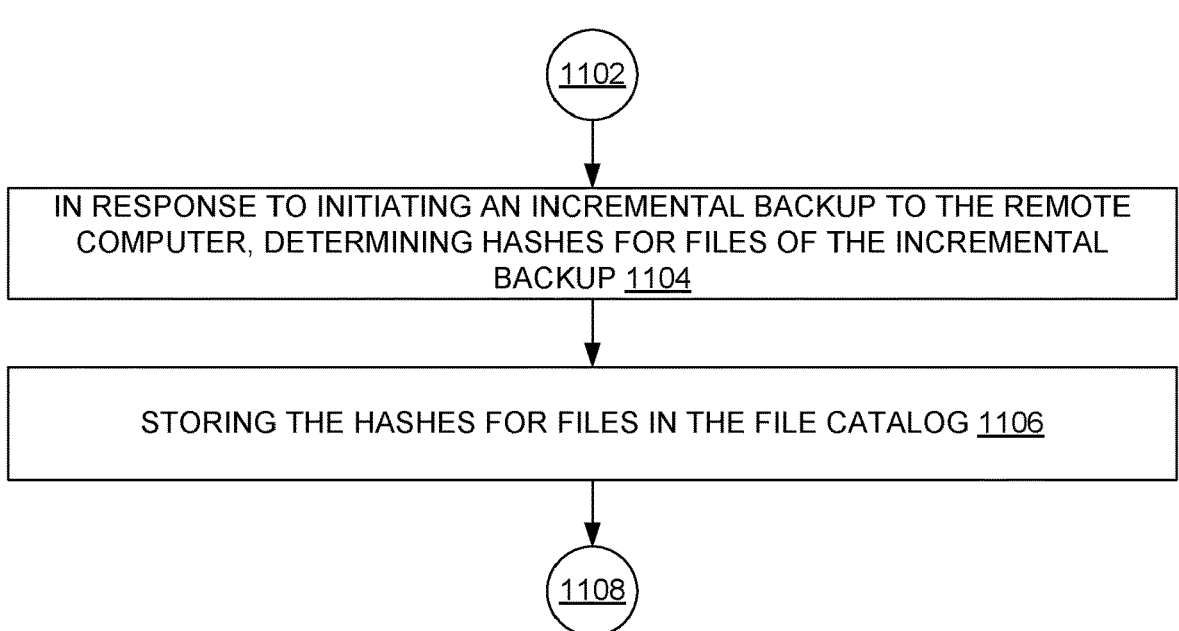
FIG. 11 illustrates another example process flow that can facilitate remote backup restore with a local dedupe engine, in accordance with an embodiment of this disclosure.

FIG. 11 illustrates an example process flow 1100 that can facilitate remote backup restore with a local dedupe engine, in accordance with an embodiment of this disclosure. In some examples, one or more embodiments of process flow 1100 can be implemented by remote backup restore with a local dedupe engine component 108 of FIG. 1, or computing environment 1300 of FIG. 13.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with one or more embodiments of one or more of process flow 400 of FIG. 4, process flow 500 of FIG. 5, process flow 600 of FIG. 6, process flow 700 of FIG. 7, process flow 800 of FIG. 8, process flow 900 of FIG. 9, process flow 1000 of FIG. 10, and/or process flow 1200 of FIG. 12.

Process flow 1100 begins with 1102, and moves to operation 1104.

Operation 1104 depicts, in response to initiating an incremental backup to the remote computer, determining hashes for files of the incremental backup. That is, when an incremental data backup is performed, hashes for the corresponding files can be determined again.

This can occur where a hash for a file changes as the file's data is updated. There can be a lack of an approach to incrementally determine a file's hash, so it can be redetermined when a file is modified.

After operation 1104, process flow 1100 moves to operation 1106.

Operation 1106 depicts storing the hashes for files in the file catalog. That is, a catalog can be updated with the new hashes of operation 1104.

After operation 1106, process flow 1100 moves to 1108, where process flow 1100 ends.

FIG. 12 illustrates an example process flow 1200 that can facilitate remote backup restore with a local dedupe engine, in accordance with an embodiment of this disclosure. In some examples, one or more embodiments of process flow 1200 can be implemented by remote backup restore with a local dedupe engine component 108 of FIG. 1, or computing environment 1300 of FIG. 13.

It can be appreciated that the operating procedures of process flow 1200 are example operating procedures, and that there can be embodiments that implement more or fewer operating procedures than are depicted, or that implement the depicted operating procedures in a different order than as depicted. In some examples, process flow 1200 can be implemented in conjunction with one or more embodiments of one or more of process flow 400 of FIG. 4, process flow 500 of FIG. 5, process flow 600 of FIG. 6, process flow 700 of FIG. 7, process flow 800 of FIG. 8, process flow 900 of FIG. 9, process flow 1000 of FIG. 10, and/or process flow 1100 of FIG. 11.

Process flow 1200 begins with 1202, and moves to operation 1204.

Operation 1204 depicts maintaining a file catalog, wherein the file catalog comprises a local path for a first file, a remote backup location for the first file on a remote computer that stores a backup of local data, and a first hash of the first file. In some examples, operation 1204 can be implemented in a similar manner as operations 404-406 of FIG. 4.

In some examples, the remote backup location in the file catalog comprises an identifier of the remote computer and a snapshot identifier of a backup snapshot on the remote computer. That is, in some examples, a catalogue specifies the local path and the remote location where the file is backed up (e.g., cluster_id and dataset/snapshot-id).

In some examples, a first computing cluster comprises the local data, and wherein a second computing cluster comprises the remote computer. That is, in some examples, the local data can be stored on local cluster 102 of FIG. 1, and the remote computer can be remote cluster 106.

In some examples, the first hash comprises a secure hash algorithm 1 (SHA-1) hash.

After operation 1204, process flow 1200 moves to operation 1206.

Operation 1206 depicts determining that a copy of the first file at the local path is to be repaired. In some examples, operation 1206 can be implemented in a similar manner as operation 408 of FIG. 4.

After operation 1206, process flow 1200 moves to operation 1208.

Operation 1208 depicts identifying whether a second hash of a second file that is stored locally matches the first hash of the first file. In some examples, operation 1208 can be implemented in a similar manner as operation 404 of FIG. 4.

After operation 1208, process flow 1200 moves to operation 1210.

Operation 1210 depicts, in response to determining that the second hash matches the first hash, repairing data of the first file with data of the second file, and repairing metadata of the first file with metadata from the remote backup location. In some examples, operation 1210 can be implemented in a similar manner as operation 412 of FIG. 4.

In some examples, first metadata of the first file stored locally differs from second metadata of the second file stored locally. That is, it can be that, even when there is a local copy of a file to restore from, that copy has different metadata, so the metadata is fetched from the remote backup.

In some examples, first metadata of the first file comprises an extended attribute of the first file. That is, an extended attribute can comprise a pair of a name for the attribute and corresponding data, where the extended attribute describes information about the data in the file (e.g., a time at which the file was created).

After operation 1210, process flow 1200 moves to 1212, where process flow 1200 ends.

Example Operating Environment

In order to provide additional context for various embodiments described herein, FIG. 13 and the following discussion are intended to provide a brief, general description of a suitable computing environment 1300 in which the various embodiments of the embodiment described herein can be implemented.

For example, parts of computing environment 1300 can be used to implement one or more embodiments of local cluster 102 and/or remote cluster 106 of FIG. 1.

In some examples, computing environment 1300 can implement one or more embodiments of the process flows of FIGS. 4-12 to facilitate remote backup restore with a local dedupe engine.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which are used herein differently from one another as follows. Computer-readable storage media or machine-readable storage media can be any available storage media that can be accessed by the computer and include both volatile and nonvolatile media, and removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a nonvolatile storage such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and an optical disk drive 1320 (e.g., which can read or write from a CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314. The HDD 1314, external storage device(s) 1316 and optical disk drive 1320 can be connected to the system bus 1308 by an HDD interface 1324, an external storage interface 1326 and an optical drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, stand-alone, executable packages of software that include, e.g., code, runtime, system tools, system libraries and settings for an application.

Further, computer 1302 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are examples, and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
at least one processor; and
at least one memory coupled to the processor, comprising instructions that, in response to execution by the at least one processor, cause the system to perform operations, comprising:
maintaining a backup of data stored on a source computer, wherein the backup is stored on a remote computer;
maintaining, on the source computer, a file catalog, wherein the file catalog comprises a local path for a first file on the source computer, a remote backup location for the first file on the remote computer, and a first hash of the first file;
determining that a copy of the first file at the local path on the source computer is corrupted;
identifying whether a second hash of a second file on the source computer matches the first hash of the first file on the source computer; and
in response to determining that the second hash of the second file on the source computer matches the first hash of the first file on the source computer,
restoring first data of the first file with second data of the second file;
obtaining second metadata that corresponds to the first file from the remote backup location for the first file on the remote computer, to produce remotely-obtained second metadata, and
restoring first metadata of the first file with the remotely-obtained second metadata from the remote backup location for the first file on the remote computer, wherein the source computer and the remote computer differ.

2. The system of claim 1, wherein the operations further comprise:
in response to determining that no hash of a file on the source computer matches the first hash of the first file, restoring the first data and the first metadata of the first file with third data and the second metadata from the remote backup location for the first file on the remote computer.

3. The system of claim 1, wherein the identifying of whether the second hash matches the first hash of the first file is performed based on determining that a number of duplicate files on the source computer is greater than or equal to a determined threshold value.

4. The system of claim 1, wherein the operations further comprise:
subsequent to performing the identifying of whether the second hash matches the first hash of the first file, determining to halt considering local copies of files when restoring files in response to determining that a number of duplicate files on the source computer is less than a determined threshold value.

5. The system of claim 4, wherein the operations further comprise:
storing hashes of files in the file catalog while processing local copies of files when restoring files is halted.

6. The system of claim 1, wherein the identifying of whether the second hash matches the first hash of the first file is performed by a data deduplication component of the source computer.

7. The system of claim 1, wherein the identifying of whether the second hash matches the first hash of the first file comprises:
sending, to a data deduplication component of the source computer, the first hash from the file catalog; and
receiving respective local file paths of a group of files that comprises the second file, wherein respective hashes of respective files of the group of files match the first hash.

8. A method, comprising:
maintaining, by a system comprising at least one processor, a file catalog, wherein the file catalog comprises a local path for a first file on the system, a remote backup location for the first file on a remote computer that stores a backup of data of the system, and a first hash of the first file;
determining, by the system, that a copy of the first file at the local path on the system is corrupted;
identifying, by the system, whether a second hash of a second file on the system matches the first hash of the first file; and
in response to determining that the second hash matches the first hash,
restoring, by the system, data of the first file with data of the second file,
obtaining, by the system, second metadata that corresponds to the first file from the remote backup location for the first file on the remote computer, and
restoring, by the system, first metadata of the first file with the second metadata that is obtained from the remote backup location for the first file on the remote computer.

9. The method of claim 8, wherein the identifying of whether the second hash matches the first hash of the first file comprises:
sending, to a data deduplication component of the system, the first hash from the file catalog; and
receiving respective stubs of a group of files that comprises the second file, wherein respective hashes of respective files of the group of files match the first hash.

10. The method of claim 8, wherein the identifying of whether the second hash matches the first hash of the first file comprises:
sending, to a data deduplication component of the system, the first hash from the file catalog; and
receiving, from the data deduplication component, an indication that no hashes of files match the first hash.

11. The method of claim 8, further comprising:
in response to initiating, by the system, an incremental backup to the remote computer, determining hashes for files of the incremental backup; and
storing, by the system, the hashes for files in the file catalog.

12. The method of claim 8, further comprising:
enabling, by the system, processing of local file copies when restoring the file based on file duplication statistics received from a deduplication engine.

13. The method of claim 8, further comprising:

enabling, by the system, processing of local file copies when restoring the file based on a current level of file deduplication on the system.

14. The method of claim 13, further comprising:

determining, by the system, the current level of file deduplication on the system from a deduplication component of the system.

15. A non-transitory computer-readable medium comprising instructions that, in response to execution, cause a system comprising at least one processor to perform operations, comprising:

maintaining a file catalog, wherein the file catalog comprises a local path for a first file, a remote backup location for the first file on a remote computer that stores a backup of local data, and a first hash of the first file;

determining that a copy of the first file at the local path is to be repaired;

identifying whether a second hash of a second file that is stored locally matches the first hash of the first file; and in response to determining that the second hash matches the first hash, restoring data of the first file with data of the second file, obtaining second metadata that corresponds to the first file from the remote backup location for the first file on the remote computer, and restoring first metadata of the first file with the second metadata from the remote backup location.

16. The non-transitory computer-readable medium of claim 15, wherein first metadata of the first file stored locally differs from second metadata of the second file stored locally.

17. The non-transitory computer-readable medium of claim 15, wherein the remote backup location in the file catalog comprises an identifier of the remote computer and a snapshot identifier of a backup snapshot on the remote computer.

18. The non-transitory computer-readable medium of claim 15, wherein first metadata of the first file comprises an extended attribute of the first file.

19. The non-transitory computer-readable medium of claim 15, wherein a first computing cluster comprises the local data, and wherein a second computing cluster comprises the remote computer.

20. The non-transitory computer-readable medium of claim 15, wherein the first hash comprises a secure hash algorithm 1 (SHA-1) hash.

* * * * *